US012811406B2

(12) United States Patent
Feng et al.

(10) Patent No.: US 12,811,406 B2
(45) Date of Patent: Nov. 24, 2026

(54) SYSTEMS AND METHOD FOR DISTRIBUTED ENERGY RESOURCES POWER ESTIMATION

(71) Applicant: General Electric Company, Schenectady, NY (US)

(72) Inventors: Bojun Feng, Schenectady, NY (US); Nurali Virani, Scotia, NY (US); Honggang Wang, Clifton Park, NY (US); Benoit Christophe, Massy (FR); Kiran Kumar Pratapagiri, Hyderabad (IN)

(73) Assignee: General Electric Company, Schenectady, NY (US)

( * ) Notice: Subject to any disclaimer, the term of this patent is extended or adjusted under 35 U.S.C. 154(b) by 687 days.

(21) Appl. No.: 18/327,594

(22) Filed: Jun. 1, 2023

(65) Prior Publication Data

US 2024/0405565 A1 Dec. 5, 2024

(51) Int. Cl.
*H02J 3/38* (2026.01)
*H02J 3/00* (2026.01)

(52) U.S. Cl.
CPC .............. *H02J 3/381* (2013.01); *H02J 3/004* (2020.01)

(58) Field of Classification Search
CPC ......... H02J 3/381; H02J 3/004; H02J 2203/20
See application file for complete search history.

(56) References Cited

U.S. PATENT DOCUMENTS

| | | | | |
|---|---|---|---|---|
| 11,347,907 | B2 * | 5/2022 | Wang | G06F 30/18 |
| 11,584,250 | B1 * | 2/2023 | Palombini | B60L 53/16 |
| 11,636,557 | B2 * | 4/2023 | Wang | G06Q 50/06 700/286 |
| 12,199,432 | B2 * | 1/2025 | Rahim | G05B 19/042 |

(Continued)

FOREIGN PATENT DOCUMENTS

CN 109119999 A 1/2019

OTHER PUBLICATIONS

Jiao, Xiangqing, et al., "Load Model Verification, Validation and Calibration Framework by Statistical Analysis on Field Data", International Journal of Emerging Electric Power Systems, 2017, 7 pp.

(Continued)

*Primary Examiner* — Ziaul Karim
(74) *Attorney, Agent, or Firm* — Armstrong Teasdale LLP

(57) ABSTRACT

A system for predicting performance of electric power generation and delivery systems is provided. The system includes a computing device including at least one processor in communication with at least one memory. The at least one processor is programmed to store a first plurality of attribute data for a plurality of measured assets attached to a grid, store a plurality of constraints for matching measured assets to unmeasured assets, receive a second plurality of attribute data for an unmeasured asset attached to the grid, compare the first plurality of attribute data to the second plurality of attribute data and the plurality of constraints associated with the unmeasured asset, determine a measured asset of the plurality of measured assets to assign to the unmeasured (Continued)

asset based on the comparison, and determine a performance forecast for the unmeasured asset based on a power performance of the determined measured asset.

20 Claims, 11 Drawing Sheets

(56) References Cited

U.S. PATENT DOCUMENTS

| | | | | |
|---|---|---|---|---|
| 2009/0066287 | A1* | 3/2009 | Pollack | G06Q 50/00 180/65.21 |
| 2011/0004446 | A1* | 1/2011 | Dorn | H04L 43/0817 709/217 |
| 2012/0144828 | A1* | 6/2012 | Lazaris | H02J 3/381 60/641.1 |
| 2012/0150679 | A1* | 6/2012 | Lazaris | F03G 6/065 705/26.2 |
| 2015/0012146 | A1* | 1/2015 | Cherian | G05B 13/02 700/291 |
| 2015/0066231 | A1* | 3/2015 | Clifton | G05F 1/66 307/46 |
| 2015/0073615 | A1* | 3/2015 | Forbes, Jr. | G05B 11/01 700/286 |
| 2019/0362070 | A1* | 11/2019 | Abbaszadeh | F03D 17/00 |
| 2021/0221247 | A1* | 7/2021 | Daniel | B60L 53/63 |
| 2022/0029424 | A1* | 1/2022 | Burra | G05B 19/042 |
| 2023/0231378 | A1* | 7/2023 | Buttgenbach | H02J 3/003 307/38 |

OTHER PUBLICATIONS

Xu, Yijun, et al., "Response—Surface-Based Bayesian Inference for Power System Dynamic Parameter Estimation", Article in IEEE Transactions on Smart Grid, Jan. 9, 2019, 12 pp.

Kristensen, Thomas G., et al., "Methods for Similarity-Based Virtual Screening", Computational and Structural Biotechnology Journal, vol. No. 5, Issue 6, Feb. 2013, 6 pp.

Huang, Zhenyu, et al., "Generator Dynamic Model Validation and Parameter Calibration Using Phasor Measurements at the Point of Connection", IEEE Transactions on Power Systems, vol. 28, No. 2, May 2013, 11 pp.

North American Electric Reliability Corporation, "Power System Model Validation", A White Paper by the NERC Model Validation Task Force of the Transmission Issues Subcommittee, Dec. 2010, 53 pp.

Willett, P., et al., "Structural Biology in Drug Metabolism and Drug Discovery", Biochemical Society Transactions, vol. 31, Part 3, 2003, 4 pp.

* cited by examiner

PV array facing south at fixed tilt

One axis tracking PV array with axis oriented south

Two-axis tracking PV array

Distance constraints: 10km

Distance constraints: 100km

Distance constraints: 1000km

SYSTEMS AND METHOD FOR DISTRIBUTED ENERGY RESOURCES POWER ESTIMATION

BACKGROUND

The field of the invention relates generally to predicting performance of electric power generation and delivery systems and, more particularly, to systems and methods for using machine learning to predict distributed energy resources (DER) power generation and usage in an electric network.

Distributed Energy Resources (DER) are small-scale power generation sources generally located close to where electricity is used (e.g., a home or business), and provide an alternative to or an enhancement of the traditional electric power grid. Distributed energy encompasses a range of technologies including fuel cells, microturbines, reciprocating engines, load reduction, and other energy management technologies. DER also involves power electronic interfaces, as well as communications and control devices for efficient dispatch and operation of single generating units, multiple system packages, and aggregated blocks of power.

DER can be maintained by a plurality of different parties both industrial and residential. These parties and their corresponding DER devices may be managed by a plurality of different tools. Accordingly, it can be difficult to accurately monitor each DER individually for grid level analysis and forecasting.

Accurate and scalable DER forecasting has positive impact on effective grid operation and planning. Estimating forecasts of geographically distributed DERs output (load or generation) requires a large historical dataset and weather information, which might not be easily available. Accordingly, there is a need to use minimal data or information to derive the DER forecast which would improve system visibility.

BRIEF DESCRIPTION

In one aspect, a system for predicting performance of electric power generation and delivery systems is provided. The system includes a computing device including at least one processor in communication with at least one memory device. The at least one processor is programmed to store a first plurality of attribute data for a plurality of measured assets attached to a grid. The at least one processor is also programmed to store a plurality of constraints for matching measured assets to unmeasured assets. The at least one processor is further programmed to receive a second plurality of attribute data for an unmeasured asset attached to the grid. In addition, the at least one processor is programmed to compare the first plurality of attribute data to the second plurality of attribute data and the plurality of constraints associated with the unmeasured asset. Moreover, the at least one processor is programmed to determine a measured asset of the plurality of measured assets to assign to the unmeasured asset based on the comparison. Furthermore, the at least one processor is programmed to determine a performance forecast for the unmeasured asset based on a power performance of the determined measured asset. The system may have additional, less, or alternate functionality, including that discussed elsewhere herein.

In another aspect, a computer-implemented method for predicting performance of electric power generation and delivery systems is provided. The method is implemented by a computing device including at least one processor in communication with at least one memory device. The method includes storing, in the at least one memory device, a first plurality of attribute data for a plurality of measured assets attached to a grid. The method also includes storing, in the at least one memory device, a plurality of constraints for matching measured assets to unmeasured assets. The method further includes receiving, by the at least one processor, a second plurality of attribute data for an unmeasured asset attached to the grid. In addition, the method includes comparing, by the at least one processor, the first plurality of attribute data to the second plurality of attribute data and the plurality of constraints associated with the unmeasured asset. Moreover, the method includes determining, by the at least one processor, a measured asset of the plurality of measured assets to assign to the unmeasured asset based on the comparison. Furthermore, the method includes determining, by the at least one processor, a performance forecast for the unmeasured asset based on a power performance of the determined measured asset. The method may have additional, less, or alternate functionality, including that discussed elsewhere herein.

In a further aspect, a system for predicting performance of electric power generation and delivery systems is provided. The method includes a computing device including at least one processor in communication with at least one memory device. The at least one processor is programmed to store a first plurality of attribute data for a plurality of measured assets attached to a grid. The at least one processor is also programmed to store a plurality of constraints for matching measured assets to unmeasured assets. The at least one processor is further programmed to receive a second plurality of attribute data for a plurality of unmeasured assets attached to the grid. In addition, the at least one processor is programmed to compare the first plurality of attribute data to the second plurality of attribute data and a plurality of constraints associated with the plurality of unmeasured assets. Moreover, the at least one processor is programmed to determine a first plurality of measured assets of the plurality of measured assets to assign to a first plurality of unmeasured asset of the plurality of unmeasured assets based on the comparison. Furthermore, the at least one processor is programmed to determine a plurality of performance forecasts for the first plurality of unmeasured assets based on a power performance of the first plurality of measured assets. The system may have additional, less, or alternate functionality, including that discussed elsewhere herein.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

DETAILED DESCRIPTION

Figure 1:
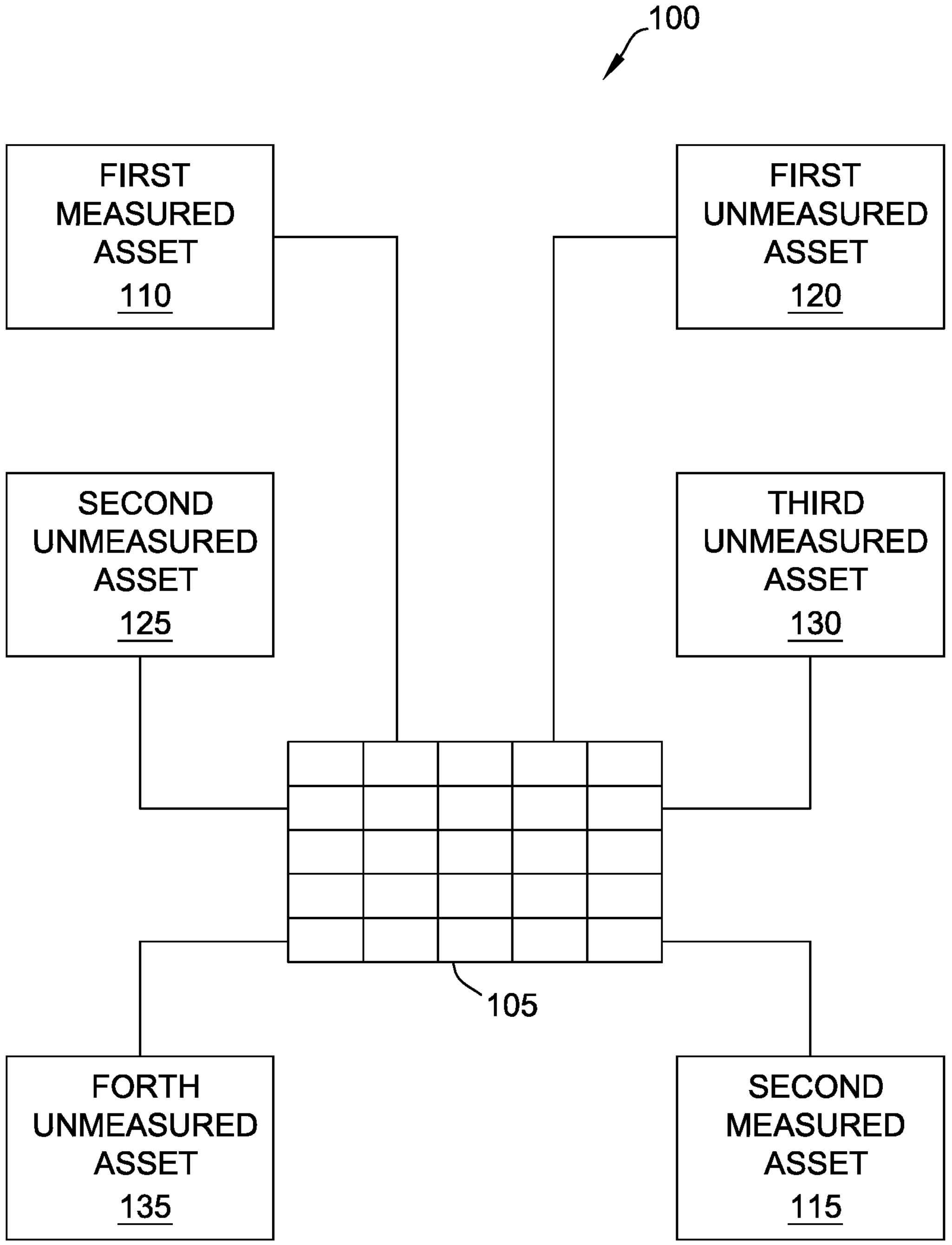
FIG. 1 illustrates a block diagram of a power distribution system, in accordance with at least one embodiment.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components, and circuits have not been described in detail so as not to obscure the embodiments.

One or more specific embodiments are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The field of the invention relates generally to predicting performance of electric power generation and delivery systems and, more particularly, to systems and methods for using machine learning to predict distributed energy resources (DER) power generation and usage in an electric network. The systems and methods described herein describe a bellwether analysis and forecasting (BAF) system. The BAF system provides a scalable, customizable Distributed Energy Resources (DER) power estimation system and method, using only attributes data (solar tilt angle, tilt azimuth, geospatial distance, Child similarity threshold) rather than historical time series.

DER technologies consist primarily of energy generation and storage systems placed at or near the point of use. DER are electric generation units (typically in the range of 3 kW to 50 MW) located within the electric distribution system at or near the end user. They are parallel to the electric utility or stand-alone units. DER have been available for many years, and are known by different names such as generators, back-up generators, or on-site power systems. DER energy encompasses a range of technologies including fuel cells, microturbines, reciprocating engines, load reduction, and other energy management technologies.

The DER systems include natural gas energy generation, as well as renewable energy technologies, such as solar electricity, biomass power, hydroelectric, and wind turbines are also common. Many of the individual DER systems may be small and/or individual set-ups. For solar electricity for example, these can include, but are not limited to, solar farms, solar panels on carports or buildings, and/or home based solar panels. These come in a large variety of configurations, where each includes a plurality varying attributes. Many of these DER systems do not have their power outputs directly measured and/or the measurements may not be easy to access. The measurements would be useful in estimation and forecasting for the grid that these DER systems are connected to. However, measurements from many of these locations may be difficult to acquire, incomplete, and/or require significant work to integrate into the estimations systems of the grid.

The systems and methods described herein are configured to harness the attributes of the various DER systems to detect similarities between different DER systems to build associations between DER systems that are measured and those that are not directly measured. The associations are then leveraged to estimate and forecast power generation for the unmeasured DER systems. Furthermore, these techniques can also be used for unmeasured loads, in addition to power generations systems.

In the systems and methods described herein, the BAF system collects a plurality of attributes about the plurality of DER systems. Some of the DER systems are measured, while other DER systems are unmeasured. The BAF system uses nearest neighbor-based learning to derive the associations with customized constraints for every unmeasured asset. Then the BAF system applies scaling factor learning (machine learning (ML) model or parametrized gaussian distribution) for converting the power output from the measured DER system to the unmeasured DER system. In some embodiments, there may be constraints for the different attributes, including which attributes are more important for making associations. If the association does not meet the attribute requirements, the DER system creates the association, but applies a hinge loss as an attribute constraint violation penalization when no measured DER system is found satisfying all of the attribute constraints for some unmeasured assets.

More specifically, the BAF system infers the power output of an individual unmeasured DER asset using the power output of another measured DER asset. The BAF system collects the asset meta information including asset type, model, geolocation (Lat, Lon), power capacity, solar tilt angle, tilt azimuth, geospatial distance, child similarity threshold, windmill blade angle, windmill height, and/or any other attribute about the DER asset that the user and/or the system desires to use.

The BAF system determines the attribute constraints for the analysis, such as, but not limited to, distance threshold, asset type, tilt angle, tilt azimuth, max power, altitude, and/or any other attribute constraint desired. In some embodiments, the attribute constraints are set by the user to limit the associations between measured and unmeasured DER assets. For example, a constraint could be based on maximum power generation so that a 1 KW/hour asset is not paired with a 100 KW/hour asset. In another example, the constraints are configured so that a fixed solar panel is not paired with a tracking solar panel, as both provide different outputs in different conditions. The goal of the constraints is to find measured assets that are close in attributes to the unmeasured assets and thereby would provide similar power outputs.

The BAF system calculates a matrix wherein each entry indicates whether a measured asset can be paired with a target unmeasured asset, using the attribute. The BAF system selects the best measured asset for an unmeasured asset by the geographically closest source. The measured asset that fits the constraints can act as a bellwether for the unmeasured asset. The bellwether is a measured asset that can be substituted for the unmeasured asset to calculate power estimation and forecasting for the unmeasured asset. For example, if there are multiple measured assets that could be matched to the unmeasured asset, the BAF system selects the closest measured asset. By selecting the closest measured asset, the BAF system selects an asset that should have similar environmental conditions, such as weather, as the unmeasured asset.

If no measured asset completely matches the unmeasured asset based on all of the constraints, the BAF system may suggest a measured asset with minimal constraints violation with hinge loss based penalization. The hinge loss based penalization is based on the difference in attributes between the measured asset and the unmeasured asset. The BAF system then derives the power output time series for the unmeasured asset based on the known power output of the measured asset. The derivation between the measured and unmeasured assets could be represented by a scaling and/or shifting operation, or a regression model.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS' include, but are not limited to including. Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

In another embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

FIG. 1 illustrates a block diagram of a power distribution system 100. The power distribution system 100 includes a grid 105 with a number of connected components including a plurality of DER assets 110-135. The DER assets 110-135 include measured assets 110 and 115 and unmeasured assets 120-135. Each DER asset 110-135 is connected to the grid 105 and provides power based on its operation. Each DER asset 110-135 also includes a plurality of attributes, which describe the configuration and capabilities of the corresponding asset. The DER assets 110-135 include natural gas energy generation, as well as renewable energy technologies, such as solar electricity, biomass power, hydroelectric, and wind turbines. Many of the individual DER 110-135 may be small and/or individual set-ups. For solar electricity for example, these can include, but are not limited to, solar farms, solar panels on carports or buildings, and/or home based solar panels.

While FIG. 1 shows a plurality of power generating assets 110-135, one having skill in the art would understand that the systems and methods described herein can also be applied to loads.

Figure 2:
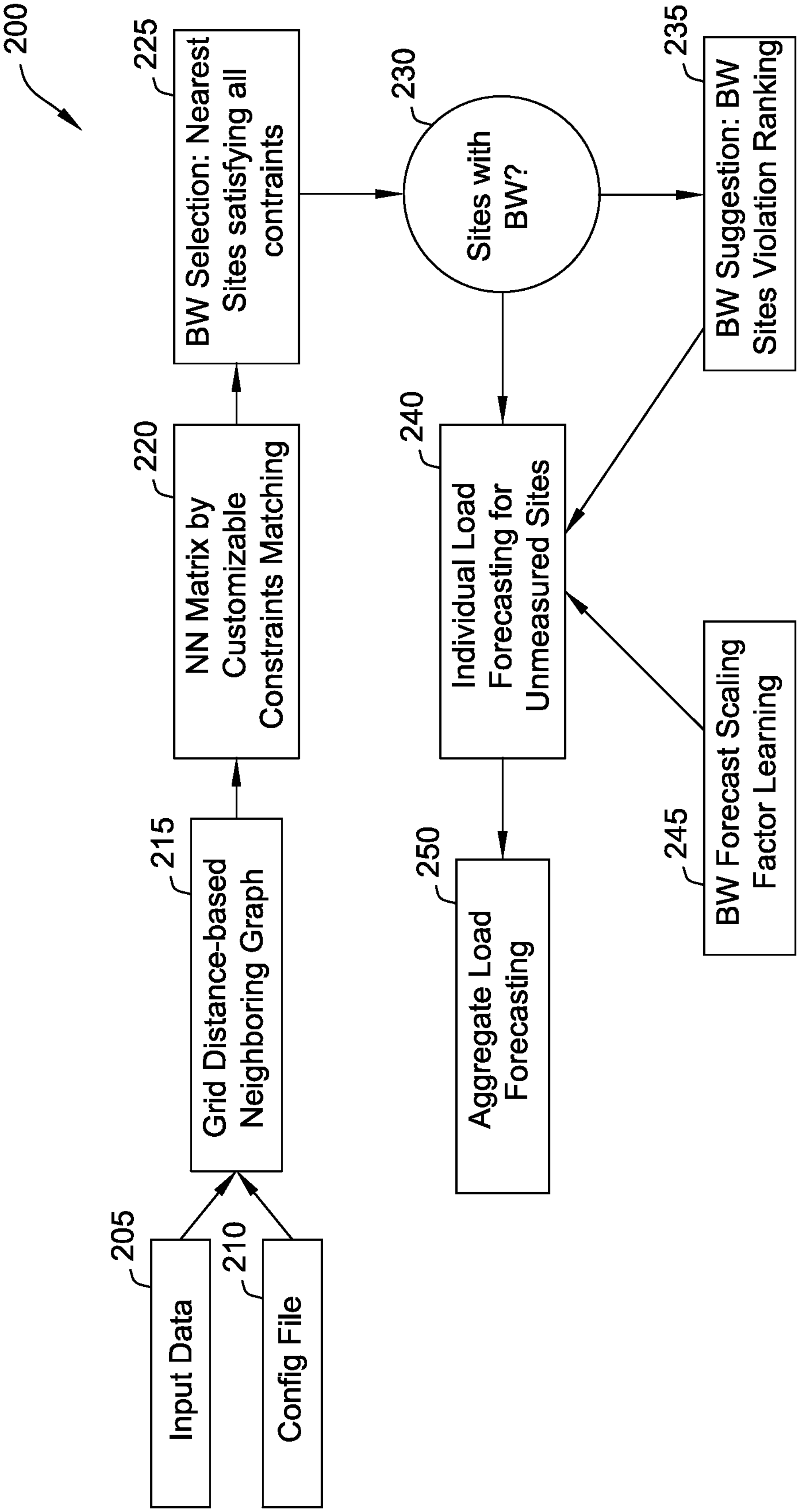
FIG. 2 illustrates a process for using machine learning to predict distributed energy resources (DER) power generation and usage in an electric network in accordance with at least one embodiment.

FIG. 2 illustrates a process 200 for using machine learning to predict distributed energy resources (DER) power generation and usage in an electric network in accordance with at least one embodiment. In the exemplary embodiment, process 200 is performed by the bellwether analysis and forecasting (BAF) computer device 910 (shown in FIG. 9).

In the exemplary embodiment, the BAF computer device 910 receives a plurality of input data 205 from a plurality of data sources. The input data 205 includes attribute information for a plurality of DER assets 110-135 (shown in FIG. 1). The attributes can include, but are not limited to, asset type (photovoltaic (PV), transformer, load), asset model, geolocation (Latitude, Longitude), tilt angle, tilt azimuth, max power, altitude, and/or any other attribute constraint desired.

The BAF computer device 910 also receives one or more configuration files 210. The configuration files 210 include information on attribute constraints between measured assets 110 and 115 and unmeasured assets 120-135 for making associations.

In the exemplary embodiment, the BAF computer device 910 generates a grid distance-based neighboring graph 215. The neighboring graph 215 illustrates the relative distances between the different DER assets 110-135 shown in FIG. 1. The BAF computer device 910 generates the grid distance-based neighboring graph 215 based on the geolocation information for the plurality of DER assets 110-135 provided in the input files 205.

The BAF computer device 910 uses customizable constraint matching to generate a nearest neighbor (NN) matrix 220 based on the constraints in the configuration file 210 and the neighboring graph 215. For example, a constraint could be that the azimuth should be plus or minus 10 degrees. If the first unmeasured asset 120 have an azimuth of 120 degrees, then the row for the first unmeasured asset 120 includes measured assets 110 and 115 that have an azimuth between 110 and 130 degrees. In the exemplary embodiment, the BAF computer device 910 only includes measured assets 110 and 115 that match all of the criteria. The rows of the matrix 220 represent the different unmeasured assets 120-135, where the rows are positioned relative to each other based on their relative distances as determined in the neighboring graph 215.

In the exemplary embodiment, the scaling value is based on all the attribute data of the determined measured asset for an unmeasured asset. Using the above example, if an unmeasured asset has an azimuthal angle of 120, with a constraint of +−10. The measured asset found to be bellwether can have azimuthal angle of 115 (no violation), or have azimuthal angle of 100 (violation). The machine learning model for scaling factor learning will use 120 degree (of unmeasured asset) and 115/100 degree (of determined measured asset regardless of whether there is a violation) to determine the scaling value. This is true for all the attribute data. For example, the tilt angle of measured and unmeasured assets will also be used regardless of whether this is a violation. The scaling value=f (attribute data of determined measured asset, attribute data of the unmeasured asset)

The selected measured asset as bellwether when no measured asset satisfies all the constraints. A hinge loss value will be used to determine which measured asset to select with minimum violation. For each violation of the plurality of constraints, this hinge loss value will be based on one or more violation of the plurality of constraints and one or more weights associated with one or more violation of the plurality of constraints. Still using the above example, the unmeasured asset has azimuthal angle of 120, constraint is +−10 and there is a weight 2.0 associated with the violation of the azimuthal angle. If the measured asset has azimuthal angle 100 degree, which the constraint is violated, there is going to be a contribution to the hinge loss value of $2.0\times|120-100|=40$. If the measured asset has azimuthal angle of 115, which means there is no constraint violation, there will be a contribution to the hinge loss of 0. Among all the constraints, the aggregated hinge loss value will be the sum of the contribution of each constraints, and the measured asset will be selected with the minimum hinge loss. If there exist a measured asset that satisfies all the constraints, the hinge loss will be zero.

Based on the matrix 220 and for each unmeasured asset 120-135, the BAF computer device 910 selects the nearest measured asset 110 and 115 that fits the constraints to act as a bellwether 225 for the unmeasured asset 120-135. The bellwether 225 is a measured asset 110 and 115 that can be substituted for the unmeasured asset 120-135 to calculate power estimation and forecasting for the unmeasured asset 120-135. In this stage, the BAF computer device 910 only selects bellwethers 225 where there is a complete match between the unmeasured asset 120-135 and the measured asset 110 and 115 based on the constraints.

The BAF computer device 910 then scans all of the unmeasured assets 120-135 to determine 230 if there is a bellwether 225 associated with each of the unmeasured assets 120-135. If there is not a bellwether 225, the BAF computer device 910 determines a ranking 235 of measured assets 110 and 115 based on the corresponding amount of constraints violation between the unmeasured asset 120-135 and the corresponding measured assets 110 and 115. The BAF computer device 910 uses the ranking 235 to determine a bellwether 225 for the corresponding unmeasured asset 120-135.

The BAF computer device 910 uses the bellwethers 225 to calculated individual load forecasting 240 for the unmeasured assets 120-135 based on the measured asset acting as bellwethers 225. The BAF computer device 910 uses the historical and current power information from the bellwether 225 to calculate the load forecasting 240. In many embodiments, the BAF computer device 910 applies a scaling factor 245 to the power information from the bellwether 225. This scaling factor 245 represents the difference between the bellwether 225 and the corresponding unmeasured asset 120-135. For example, the first unmeasured asset 120 may have a maximum power output of 8 kW/hour, while the bellwether 225 has a maximum power output of 10 kW/hour. Based on the difference, the scaling factor 245 may be 0.8. This scaling factor 245 is then applied to the power output when calculating the forecast 240 for the first unmeasured asset 120. The scaling factor 245 can be calculated automatically, determined by the user, and/or calculated using machine learning.

In the machine learning example for the scaling factor 245, the BAG computer device 910 compares a plurality of historical power data for a plurality of measured assets 110 and 115. Then BAF computer device 910 also compares the attributes of each measured asset 110 and 115 to determine differences and similarities in the attributes that predict similarities and difference in power output. Based on those similarities and differences of the attributes and power output, the BAF computer device 910 determines one or more scaling factors 245 related to the different attributes of the assets 110-135.

With the individualized load forecasting 240, the BAF computer device 910 is able to aggregate 250 the load forecasting 240 at different levels of the grid 105, such as, but not limited to, the feeder or substation level.

While process 200 shows method for determining bellwethers 225 to associated with unmeasured assets 120-135 for power generation, one having skill in the art would understand that the systems and methods described herein can also be applied to loads. In this case, the BAF computer device 910 determines bellwethers 225 for unmeasured loads based on measured loads and their corresponding attributes.

Figure 3:
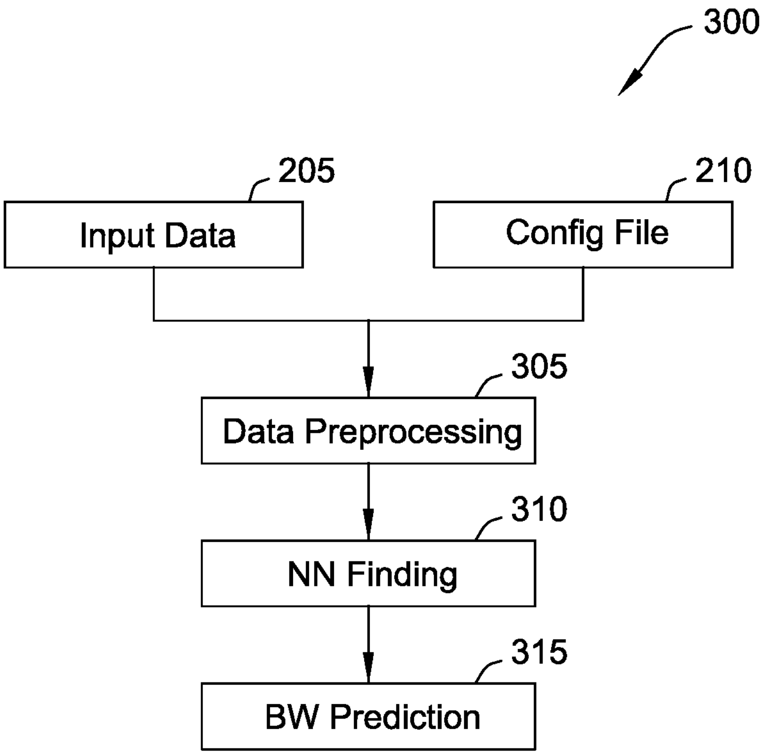
FIG. 3 illustrates a process for bellwether determination which is a part of process shown in FIG. 2.

FIG. 3 illustrates a process 300 for bellwether determination which is a part of process 200 (shown in FIG. 2). In the exemplary embodiment, process 300 is performed by the bellwether analysis and forecasting (BAF) computer device 910 (shown in FIG. 9).

In the exemplary embodiment, the BAF computer device 910 receives a plurality of input data 205 from a plurality of data sources. The input data 205 includes attribute information for a plurality of DER assets 110-135 (shown in FIG. 1) on the grid 105 (shown in FIG. 1). The attributes can include, but are not limited to, asset type (photovoltaic (PV), transformer, load), asset model, geolocation (Latitude, Longitude), tilt angle, tilt azimuth, max power, altitude, and/or any other attribute constraint desired.

The BAF computer device 910 also receives one or more configuration files 210. The configuration files 210 include information on attribute constraints between measured assets 110 and 115 and unmeasured assets 120-135 for making associations.

The BAF computer device 910 performs data preprocessing 305 on the input data 205. The data preprocessing 305 can include, but is not limited to, reformatting input data 205 from the plurality of sources, retrieving additional information that may be missing from the input data 205, and confirming the validity of the configuration files 210 and their corresponding constraints. The data preprocessing 305 can also include determining the distances between the different DER assets 120-135 on the grid 105.

The BAF computer device 910 performs nearest neighbor (NN) finding 310 on the input data 205. The NN determines the closest measured asset 110 and 115 to each unmeasured asset 120-135, where the measured asset 110 matches the constraints for the attributes of the unmeasured asset 120-135.

The BAF computer device 910 then uses the NN finding 310 to determine 315 a bellwether 225 (shown in FIG. 2) for each unmeasured asset 120-135, which is then used to calculated forecasting 240 and/or estimation for the unmeasured assets 120-135.

Figure 4:
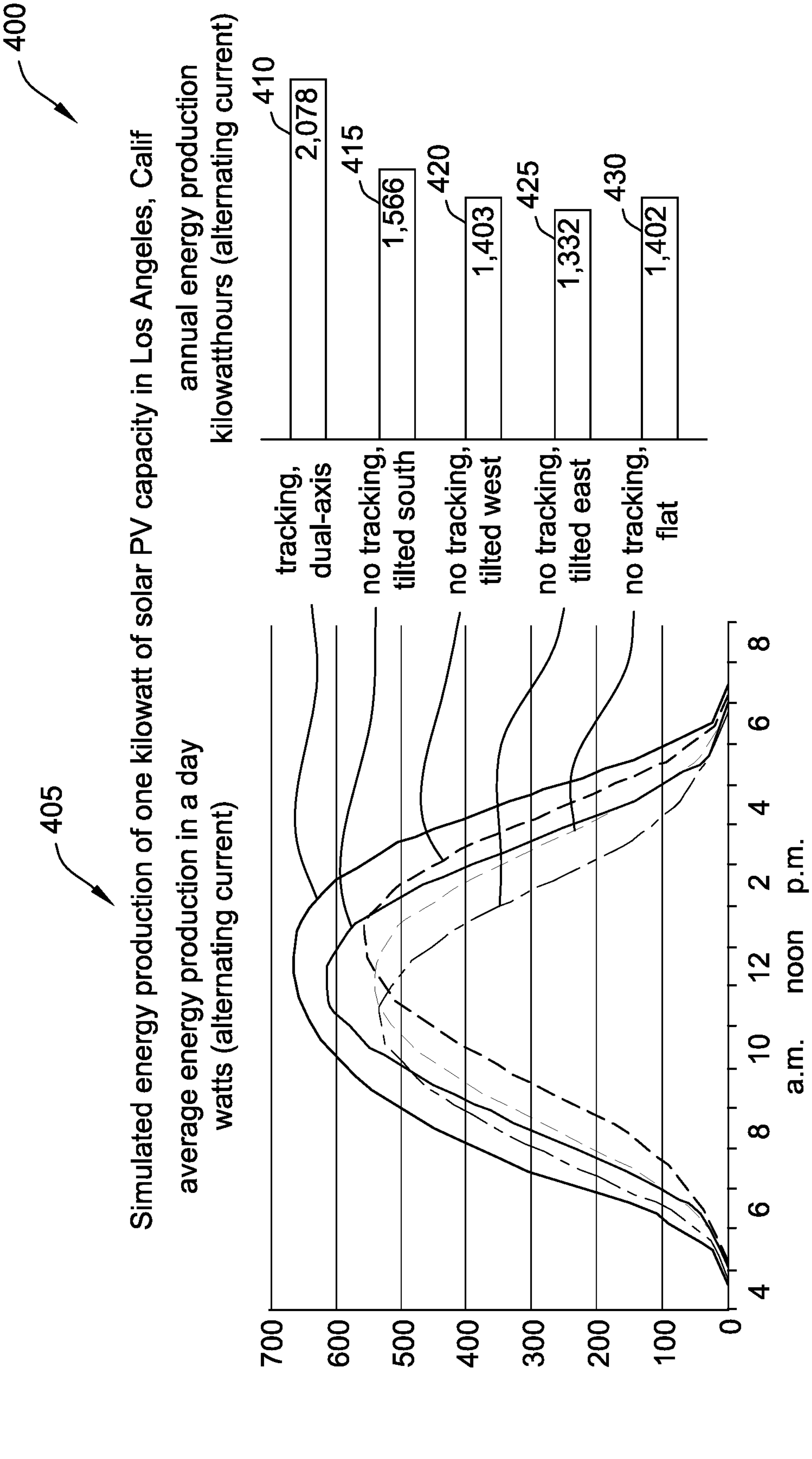
FIG. 4 illustrates a graph of a plurality of power outputs for different assets.

FIG. 4 illustrates a graph 400 of a plurality of power outputs 405 for different assets. More specifically, graph 400 shows the different power outputs 405 for five different configurations of solar panels. A first power output line 410 represents a photovoltaic (PV) panel with dual axis tracking, which means the represented PV panel can accurately track the sun as it traversed the sky. Unsurprisingly, this PV panel has the highest power output line 410. The second power output line 415 represents a second PV panel which is fixed at a specific angle and is tilted south. The third power output line 420 represents a third PV panel which is fixed at a specific angle and is tilted west. The fourth power output line 425 represents a fourth PV panel which is fixed at a specific angle and is tilted east. The fifth power output line 430 represents a fifth PV panel which is fixed lying flat, horizontally.

As shown in graph 4, each power output 405 is different based on the attributes of the corresponding PV panel (DER asset). Accordingly, the BAF computer device 910 (shown in FIG. 9), takes into account these differences in assigning bellwethers 225 and scalars 245 (both shown in FIG. 2).

Figure 5:
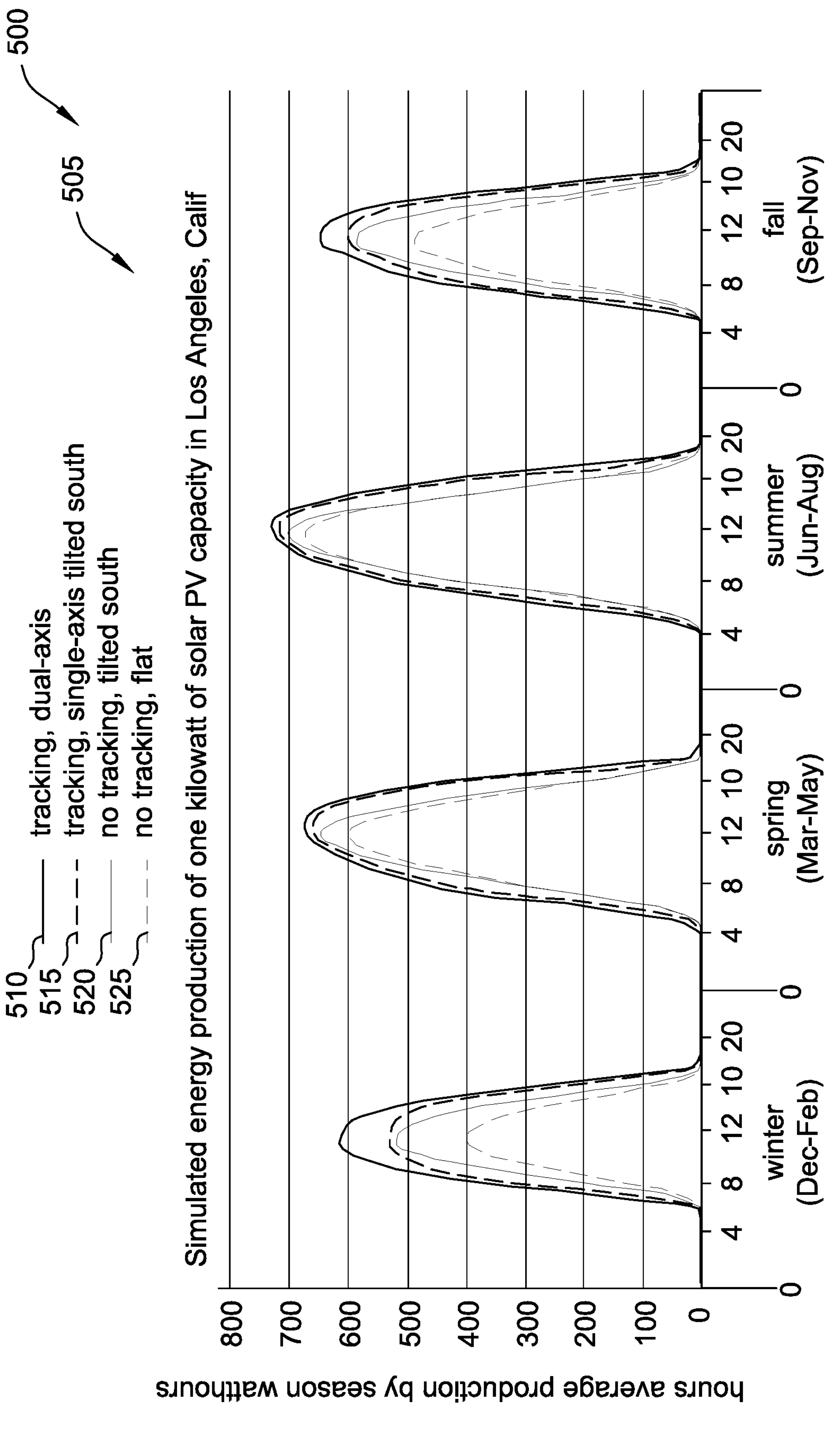
FIG. 5 illustrates a graph of a plurality of power outputs for different assets.

FIG. 5 illustrates a graph 500 of a plurality of power outputs 505 for different assets. More specifically, graph 500 shows the different power outputs 505 for four different configurations of solar panels during four different seasons of the year. A first power output line 510 represents a photovoltaic (PV) panel with dual axis tracking, which means the represented PV panel can accurately track the sun as it traversed the sky. Unsurprisingly, this PV panel has the highest power output line 510 in all of the seasons. The second power output line 515 represents a second PV panel which has single axis tracking and is tilted south. The second power output line 515 is close to the first power output line 510. The third power output line 520 represents a third PV panel which is fixed at a specific angle and is tilted south. The fourth power output line 525 represents a fourth PV panel which is fixed lying flat, horizontally.

As shown in graph 5, each power output 505 is different based on the attributes of the corresponding PV panel (DER asset). Accordingly, the BAF computer device 910 (shown in FIG. 9), takes into account these differences in assigning bellwethers 225 and scalars 245 (both shown in FIG. 2).

Figure 6A:
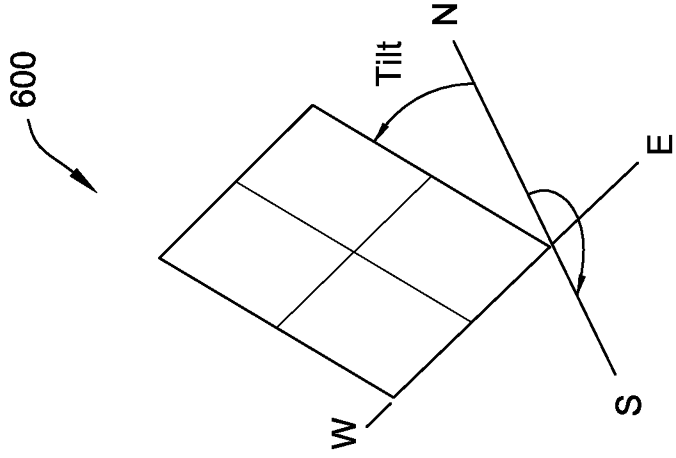
FIGS. 6A, 6B, and 6C illustrate different configurations of a PV panel.
Figure 6B:
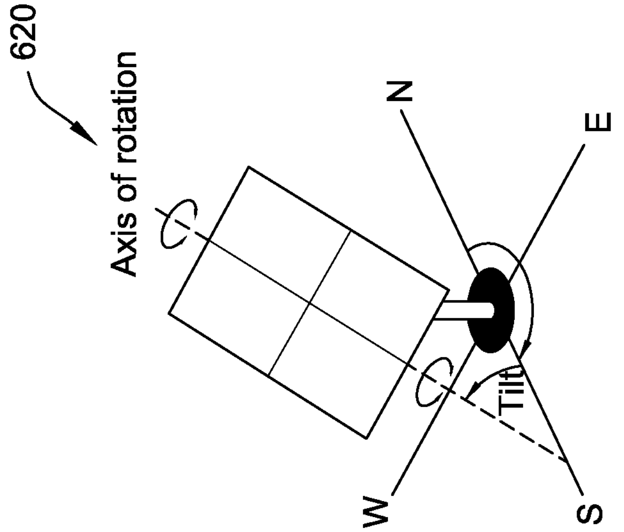
Figure 6C:
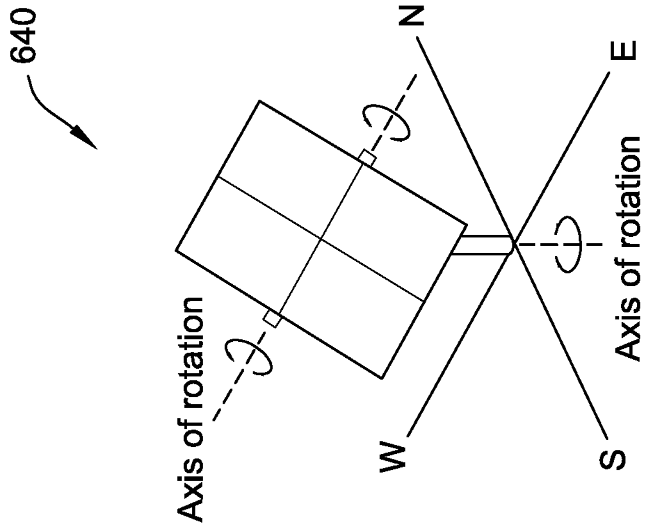

FIGS. 6A, 6B, and 6C illustrate different configurations of a PV panel. FIG. 6A illustrates a first PV panel 600 which is facing south and tilted at a fixed angle. This is similar to the configuration for second power output line 415 (shown in FIG. 4) and third power output line 520 (shown in FIG. 5). Attributes for the first PV panel 600 can include, but are not limited to, type (fixed), azimuth (180), tilt, maximum power output, and/or any other attributes that the user desires. In finding a bellwether match, the BAF computer device 910 finds measured assets 110 and 115 (shown in FIG. 1) that are the same type, at the same azimuth, having the same tilt, or having those attributes within a specific range or percentage of first PV panel 600.

FIG. 6B illustrates a second PV panel 620 which is facing south and tilted at a fixed angle. This is similar to the configuration for second power output line 515 (shown in FIG. 5). Attributes for the second PV panel 620 can include, but are not limited to, type (1 axis), azimuth (180), tilt, range of angle of rotation, maximum power output, and/or any other attributes that the user desires. Since the second power output line 515 for the second PV panel 620 and the third power line 520 for the first PV panel 600 are close and overlap in multiple places, the BAF computer device 910 may determine that the first PV panel 600 could be considered a bellwether 225 (shown in FIG. 2) for the second PV panel 620. In this situation, the BAF computer device 910 may determine a scaling factor 245 to assign to the power output of the first PV panel 600 to simulate the second PV panel 620.

FIG. 6C illustrates a third PV panel 640 with dual axis tracking, which means the third PV panel 640 can accurately track the sun as it traversed the sky. This is similar to the configuration for first power output line 410 (shown in FIG. 4) and first power output line 510 (shown in FIG. 5). Attributes for the third PV panel 640 can include, but are not limited to, type (2 axis), azimuth range of angle rotation, tilt range of angle of rotation, maximum power output, and/or any other attributes that the user desires.

Figure 7A:
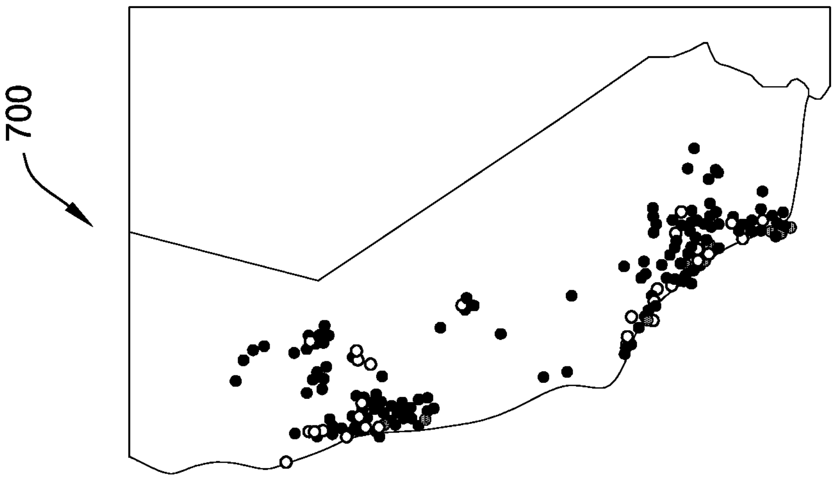
FIGS. 7A, 7B, and 7C illustrate three different states of a map of a plurality of DER assets in accordance with at least one embodiment.
Figure 7B:
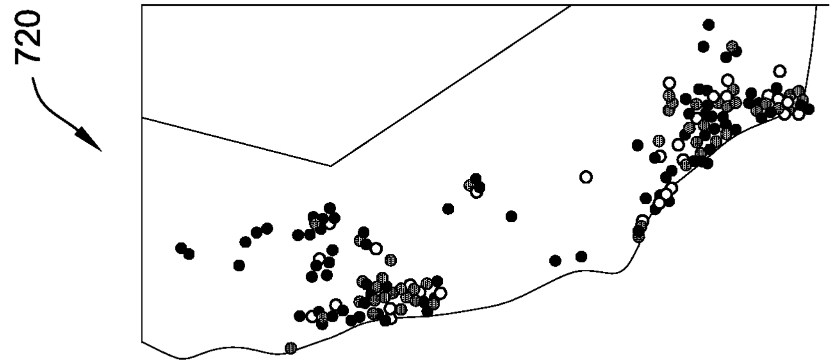
Figure 7C:
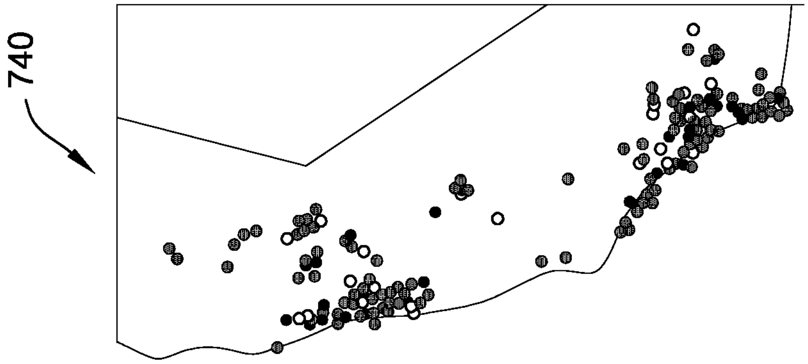

FIGS. 7A, 7B, and 7C illustrate three different states of a map of a plurality of DER assets in accordance with at least one embodiment. FIG. 7A illustrates a map 700 of a plurality of DER assets, where the distance constraint has been limited to 10 km or less. In this map 700 there are a plurality of light dots representing measured DER assets 110 and 115 (shown in FIG. 1). The medium and dark dots are unmeasured DER assets 120-135 (shown in FIG. 1). The medium dots represent unmeasured DER assets 120-135 that all of their constraints are satisfied by a measured DER asset 110 and 115. The dark dots represent unmeasured DER assets 120-135 where one or more constraints are not met.

FIG. 7B illustrates a map 720 of a plurality of DER assets, where the distance constraint has been limited to 100 km or less. FIG. 7B shows more medium dots. As the distance constraint is relaxed and the maximum distance between the unmeasured DER asset 120-135 and the number of medium dots, where all of the constraints are met, increases.

FIG. 7C illustrates a map 740 of a plurality of DER assets, where the distance constraint has been limited to 1000 km or less. FIG. 7C shows significantly more medium dots (all constraints match) and significantly fewer dark dots (one or more constraints do not match). As the distance constraint is relaxed and the maximum distance between the unmeasured DER asset 120-135 and the number of medium dots, where all of the constraints are met, increases.

FIGS. 7A-7C illustrate how the results would change when the geodistance constraint of "plurality of the constraints" is changed or relaxed. FIGS. 7A-C contain the results of three runs after relaxing the geographic distance. On the other hand, relaxing the geographic distance constraint to adjust the balance between the number of unmeasured assets that can and cannot find a measured asset that satisfy all the constraints. Furthermore, any constraint out of the "plurality of the constraints" could be relaxed instead of just geographic distance constraint.

Figure 8:
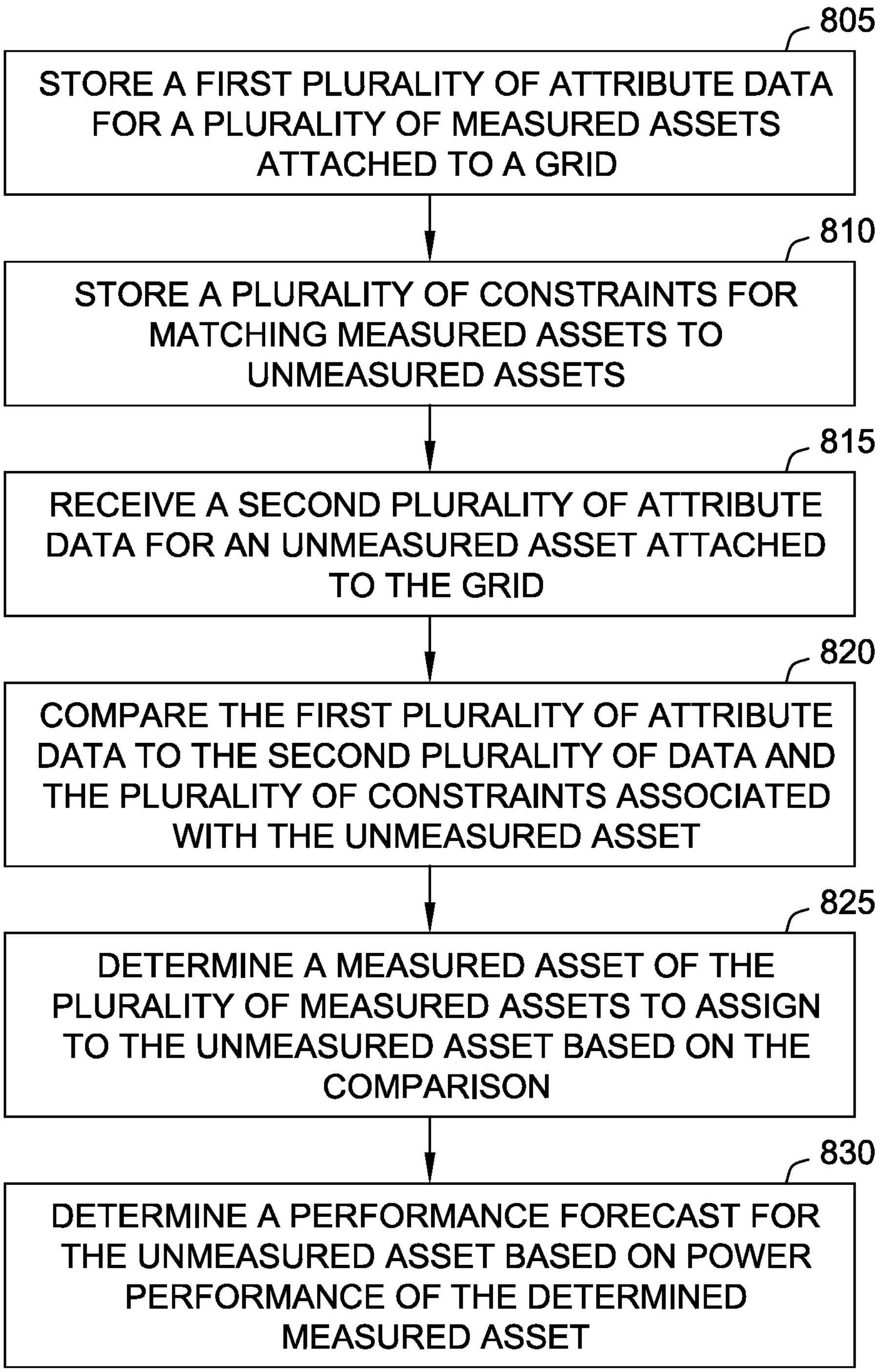
FIG. 8 illustrates a process for predicting performance of electric power generation and delivery systems using the system shown in FIG. 1.

FIG. 8 illustrates a process 800 for predicting performance of electric power generation and delivery systems using the system 100 (shown in FIG. 1). In the exemplary embodiment, process 800 is performed by the BAF computer device 910 (shown in FIG. 9).

In the exemplary embodiment, the BAF computer device 910 stores 805 a first plurality of attribute data for a plurality of measured assets 110 and 115 attached to a grid 105 (all shown in FIG. 1). The BAF computer device 910 stores 810 a plurality of constraints for matching measured assets 110 to unmeasured assets 120 (shown in FIG. 1). The plurality of measured assets 110 and 115 includes distributed energy resources including at least one of wind, photovoltaic, geothermal, biomass, or hydroelectric power generators. The first plurality of attribute data includes, but is not limited to, at least one of asset type, model, geolocation, power capacity, solar tilt angle, tilt azimuth, geospatial distance, child similarity threshold, windmill blade angle, or windmill height. The plurality of measured assets may be power generating assets and/or power loads.

In the exemplary embodiment, the BAF computer device 910 receives 815 a second plurality of attribute data for an unmeasured asset 120 attached to the grid 105. In the exemplary embodiment, the BAF computer device 910 compares 820 the first plurality of attribute data to the second plurality of attribute data and the plurality of constraints associated with the unmeasured asset 120.

In the exemplary embodiment, the BAF computer device 910 determines 825 a measured asset 110 of the plurality of measured assets 110 and 115 to assign to the unmeasured asset 120 based on the comparison. In at least one embodiment, the BAF computer device 910 assigns the determined measured asset 110 to the unmeasured asset 120 when there is a match of all of the plurality of constraints for the unmeasured asset 120.

In the exemplary embodiment, the BAF computer device 910 determines 830 a performance forecast 240 (shown in FIG. 2) for the unmeasured asset 120 based on a power performance of the determined measured asset 110.

In some further embodiments, the BAF computer device 910 determines a subset of measured assets 110 that match all of the plurality of constraints for the unmeasured asset 120. The BAF computer device 910 determines a distance between the unmeasured asset 120 and each measured asset 110 of the subset of measured assets 110. The BAF computer device 910 selects the measured asset 110 of the subset of measured assets 110 with the smallest distance to the unmeasured asset 120.

In still further embodiments, the BAF computer device 910 determines that no measured asset 110 of the plurality of measured assets 110 matches all of the plurality of constraints for the unmeasured asset 120. The BAF computer device 910 determines one or more violated constraints of the plurality of constraints for one or more of the plurality of measured assets 110. The BAF computer device 910 selects the measured asset based on a number of differences based on the corresponding one or more violated constraints. The BAF computer device 910 selects the measured asset 110 of the plurality of measured assets 110 by relaxing a geographic distance constraint or a first constraint of the plurality of constraints.

In additional embodiments, the BAF computer device 910 assigns a hinge loss value to the power performance of the determined measured asset 110 to determine the performance forecast. The hinge loss value may be based on one or more violations of the plurality of constraints for the determined managed asset. The hinge loss value may be based on one or more weights associated with one or more violated constraints. In some further embodiments, the hinge loss value is based on a machine learning (ML) analysis of the plurality of measured assets 110, the first plurality of attribute data, and power performance of the plurality of measured assets 110.

Figure 9:
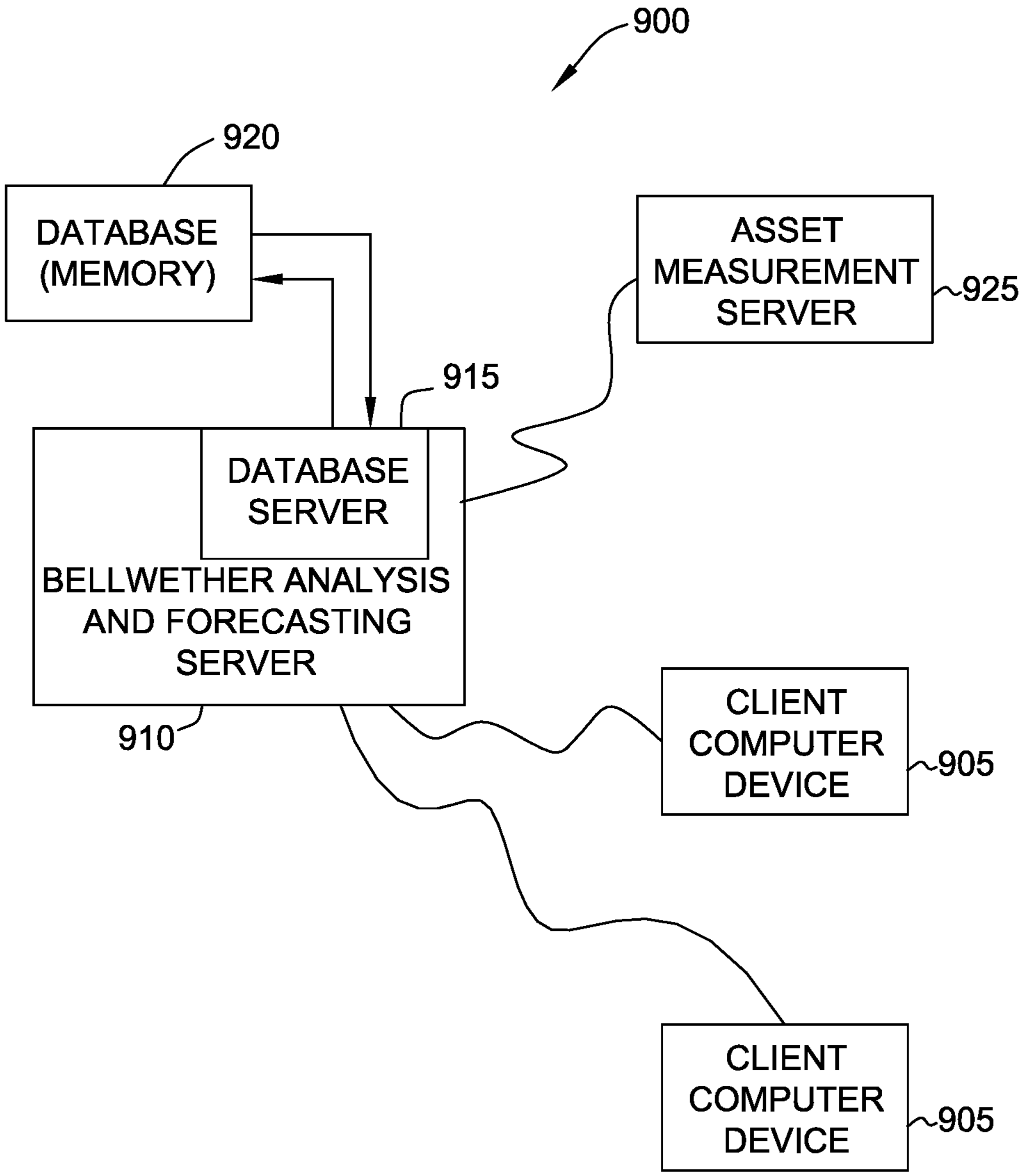
FIG. 9 depicts a simplified block diagram of an exemplary computer system for implementing the processes shown in FIGS. 2, 3, and 8.

FIG. 9 depicts a simplified block diagram of an exemplary computer system 900 for implementing processes 200, 300, and 800 shown in FIGS. 2, 3, and 8. In the exemplary embodiment, system 900 may be used for predicting performance of electric power generation and delivery systems. As described below in more detail, an bellwether analysis and forecasting (BAF) computer device 910 (also known as BAF server 910) may be configured to store a first plurality of attribute data for a plurality of measured assets 110 attached to a grid 105, store a plurality of constraints for matching measured assets 110 to unmeasured assets 120, receive a second plurality of attribute data for an unmeasured asset 120 attached to the grid 105, compare the first plurality of attribute data to the second plurality of attribute data and the plurality of constraints associated with the unmeasured asset 120, determine a measured asset 110 of the plurality of measured assets 110 to assign to the unmeasured asset 120 based on the comparison, and determine a performance forecast for the unmeasured asset 120 based on a power performance of the determined measured asset 110 (all shown in FIG. 1).

In the exemplary embodiment, client computer devices 905 are computers that include a web browser or a software application, which enables client computer devices 905 to access BAF server 910 using the Internet. More specifically, client computer devices 905 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client computer devices 905 may be any device capable of accessing the Internet including, but not limited to, a mobile device, a desktop computer, a laptop computer, a personal digital assistant (PDA), a cellular phone, a smartphone, a tablet, a phablet, wearable electronics, smart watch, virtual headsets or glasses (e.g., AR (augmented reality), VR (virtual reality), or XR (extended reality) headsets or glasses), chat bots, or other web-based connectable equipment or mobile devices.

A database server 915 may be communicatively coupled to a database 920 that stores data. In one embodiment, database 920 may include attributes, power performance information, constraints, and associations. In the exemplary embodiment, database 920 may be stored remotely from BAF server 910. In some embodiments, database 920 may be decentralized. In the exemplary embodiment, a person may access database 920 via client computer devices 905 or asset measurement server 925 by logging onto BAF server 910, as described herein.

BAF server 910 may be communicatively coupled with one or more the client computer devices 905. In some embodiments, BAF server 910 may be associated with, or is part of a computer network associated with grid operation, or in communication with the grid operation's computer network (not shown). In other embodiments, BAF server 910 may be associated with a third party and is merely in communication with the grid operation's computer network.

One or more asset measurement servers 925 may be communicatively coupled with BAF server 910 via the Internet or a local network. More specifically, asset measurement servers 925 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Asset measurement servers 925 may be any device capable of accessing the Internet including, but not limited to, a mobile device, a desktop computer, a laptop computer, a personal digital assistant (PDA), a cellular phone, a smartphone, a tablet, a phablet, wearable electronics, smart watch, virtual headsets or glasses (e.g., AR (augmented reality), VR (virtual reality), or XR (extended reality) headsets or glasses), chat bots, or other web-based connectable equipment or mobile devices. In the exemplary embodiments, asset measurement server 925 is in communication with one or more measured assets 110 and 115 and receives power performance information from the measured assets 110 and 115.

Figure 10:
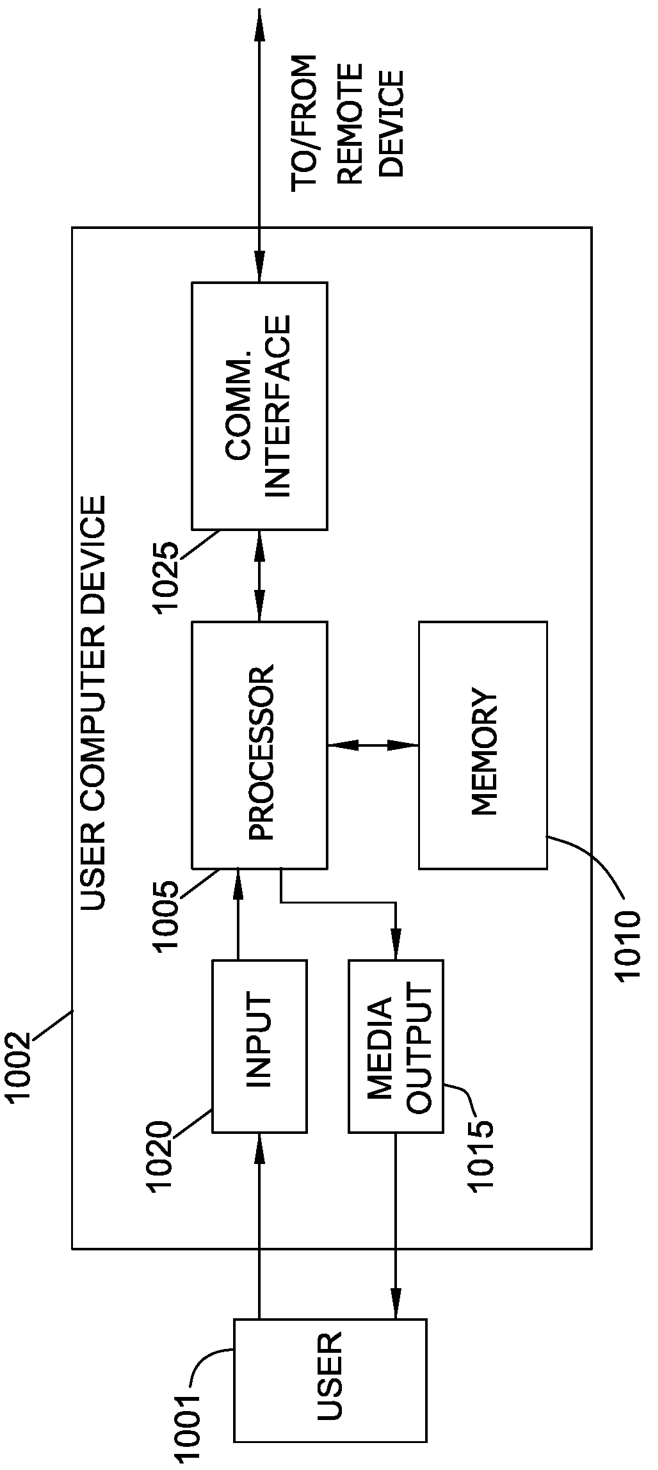
FIG. 10 depicts an exemplary configuration of client computer devices, in accordance with one embodiment of the present disclosure.

FIG. 10 depicts an exemplary configuration of client computer devices, in accordance with one embodiment of the present disclosure. User computer device 1002 may be operated by a user 1001. User computer device 1002 may include, but is not limited to, client computer device 905, BAF computer device 910, and asset measurement computer device 925 (all shown in FIG. 9).

User computer device 1002 may include a processor 1005 for executing instructions. In some embodiments, executable instructions are stored in a memory area 1010. Processor 1005 may include one or more processing units (e.g., in a multi-core configuration). Memory area 1010 may be any device allowing information such as executable instructions and/or transaction data to be stored and retrieved. Memory area 1010 may include one or more computer readable media.

User computer device 1002 may also include at least one media output component 1015 for presenting information to user 1001. Media output component 1015 may be any component capable of conveying information to user 1001. In some embodiments, media output component 1015 may include an output adapter (not shown) such as a video adapter and/or an audio adapter. An output adapter may be operatively coupled to processor 1005 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 1015 may be configured to present a graphical user interface (e.g., a web browser and/or a client application) to user 1001. A graphical user interface may include, for example, analysis and forecasting of unmeasured assets 120. In some embodiments, user computer device 1002 may include an input device 1020 for receiving input from user 1001. User 1001 may use input device 1020 to, without limitation, select an unmeasured asset 120 to analyze.

Input device 1020 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 1015 and input device 1020.

User computer device 1002 may also include a communication interface 1025, communicatively coupled to a remote device such as BAF server 910 (shown in FIG. 9). Communication interface 1025 may include, for example, a wired or wireless network adapter and/or a wireless data transceiver for use with a mobile telecommunications network.

Stored in memory area 1010 are, for example, computer readable instructions for providing a user interface to user 1001 via media output component 1015 and, optionally, receiving and processing input from input device 1020. A user interface may include, among other possibilities, a web browser and/or a client application. Web browsers enable users, such as user 1001, to display and interact with media and other information typically embedded on a web page or a website from BAF server 910. A client application allows user 1001 to interact with, for example, measured and unmeasured assets 110 and 120. For example, instructions may be stored by a cloud service, and the output of the execution of the instructions sent to the media output component 1015.

Processor 1005 executes computer-executable instructions for implementing aspects of the disclosure. In some embodiments, the processor 1005 is transformed into a special purpose microprocessor by executing computer-executable instructions or by otherwise being programmed. For example, the processor 1005 may be programmed with the instructions such as processes 200, 300, and 800 (shown in FIGS. 2, 3, and 8, respectively).

Figure 11:
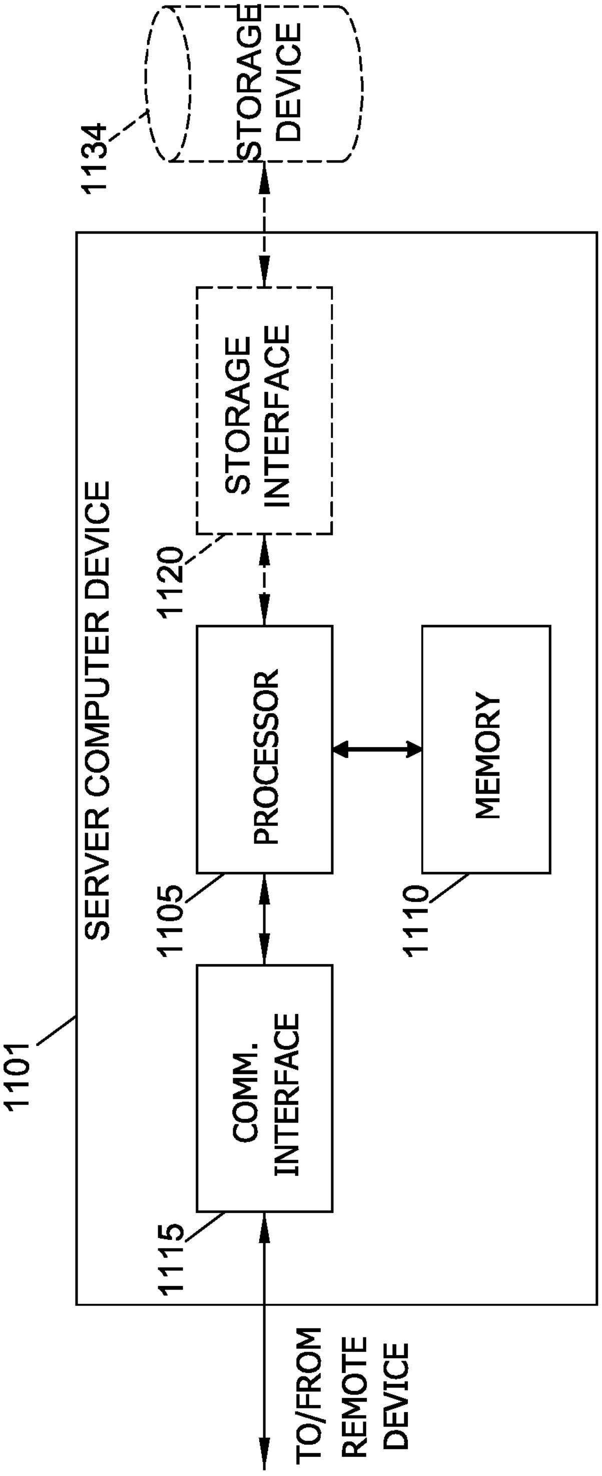
FIG. 11 illustrates an example configuration of the server system, in accordance with one embodiment of the present disclosure.

FIG. 11 illustrates an example configuration of the server system, in accordance with one embodiment of the present disclosure. Server computer device 1101 may include, but is not limited to, BAF server 910, database server 915, and asset measurement server 925 (all shown in FIG. 9). Server computer device 1101 also includes a processor 1105 for executing instructions. Instructions may be stored in a memory area 1110. Processor 1105 may include one or more processing units (e.g., in a multi-core configuration).

Processor 1105 is operatively coupled to a communication interface 1115 such that server computer device 1101 is capable of communicating with a remote device such as another server computer device 1101, BAF server 910, client computer device 905 (shown in FIG. 9), or asset measurement server 925. For example, communication interface 1115 may receive requests from client computer devices 905 via the Internet.

Processor 1105 may also be operatively coupled to a storage device 1134. Storage device 1134 is any computer-operated hardware suitable for storing and/or retrieving data, such as, but not limited to, data associated with database 920 (shown in FIG. 9). In some embodiments, storage device 1134 is integrated in server computer device 1101. For example, server computer device 1101 may include one or more hard disk drives as storage device 1134. In other embodiments, storage device 1134 is external to server computer device 1101 and may be accessed by a plurality of server computer devices 1101. For example, storage device 1134 may include a storage area network (SAN), a network attached storage (NAS) system, and/or multiple storage units such as hard disks and/or solid state disks in a redundant array of inexpensive disks (RAID) configuration.

In some embodiments, processor 1105 is operatively coupled to storage device 1134 via a storage interface 1120. Storage interface 1120 is any component capable of providing processor 1105 with access to storage device 1134. Storage interface 1120 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1105 with access to storage device 1134.

Processor 1105 executes computer-executable instructions for implementing aspects of the disclosure. In some embodiments, the processor 1105 is transformed into a special purpose microprocessor by executing computer-executable instructions or by otherwise being programmed. For example, the processor 1105 is programmed with the instructions such as processes 200, 300, and 800 (shown in FIGS. 2, 3, and 8, respectively).

At least one of the technical solutions to the technical problems provided by this system may include: (i) improved accuracy in forecasting assets; (ii) reduced time for forecasting; (iii) ability to forecast multiple assets simultaneously; (iv) reduced need for power performance information from all assets; and (v) reduced cost in monitoring assets.

The methods and systems described herein may be implemented using computer programming or engineering techniques including computer software, firmware, hardware, or any combination or subset thereof, wherein the technical effects may be achieved by performing at least one of the following steps: a) store a first plurality of attribute data for a plurality of measured assets attached to a grid, wherein the plurality of measured assets includes distributed energy resources including at least one of wind, photovoltaic, geothermal, biomass, or hydroelectric power generators, and wherein the first plurality of attribute data includes at least one of asset type, model, geolocation, power capacity, solar tilt angle, tilt azimuth, geospatial distance, child similarity threshold, windmill blade angle, or windmill height; b) store a plurality of constraints for matching measured assets to unmeasured assets, wherein the plurality of measured assets are power generating assets, and wherein the plurality of measured assets are power loads; c) receive a second plurality of attribute data for an unmeasured asset attached to the grid; d) compare the first plurality of attribute data to the second plurality of attribute data and the plurality of constraints associated with the unmeasured asset; e) determine a measured asset of the plurality of measured assets to assign to the unmeasured asset based on the comparison; f) determine a performance forecast for the unmeasured asset based on a power performance of the determined measured asset; g) assign the determined measured asset to the unmeasured asset when there is a match of all of the plurality of constraints for the unmeasured asset; h) determine a subset of measured assets that match all of the plurality of constraints for the unmeasured asset; i) determine a distance between the unmeasured asset and each measured asset of the subset of measured assets; j) select the measured asset of the subset of measured assets with the smallest distance to the unmeasured asset; k) determine that no measured asset of the plurality of measured assets matches all of the plurality of constraints for the unmeasured asset; l) determine one or more violated constraints of the plurality of constraints for one or more of the plurality of measured assets; m) select the measured asset based on a number of differences based on the corresponding one or more violated constraints; n) select the measured asset of the plurality of measured assets by relaxing a geographic distance constraint or a first constraint of the plurality of constraints; o) assign a hinge loss value to the power performance of the determined measured asset to determine the performance forecast, wherein the hinge loss value is based on one or more violations of the plurality of constraints for the determined managed asset, wherein the hinge loss value is based on one or more weights associated with one or more violated constraints, and wherein the hinge loss value is based on a machine learning (ML) analysis of the plurality of measured assets, the first plurality of attribute data, and power performance of the plurality of measured assets.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on computer systems or mobile devices, or associated with or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image data, text data, report data, and/or numerical analysis. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing-either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the computer device, the user of the computer device, the computer network hosting the computer device, services executing on the computer device, and/or other data.

Based upon these analyses, the processing element may learn how to identify characteristics and patterns that may then be applied to training models, analyzing sensor data, and detecting abnormalities.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In another embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment," "exemplary embodiment," or "one embodiment" of the present disclosure are not intended to be interpreted as excluding the existence of additional embodiments that also incorporate the recited features.

The patent claims at the end of this document are not intended to be construed under 35 U.S.C. § 112 (f) unless traditional means-plus-function language is expressly recited, such as "means for" or "step for" language being expressly recited in the claim(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for predicting performance of electric power generation and delivery systems comprising a computing device including at least one processor in communication with at least one memory device, wherein the at least one processor is programmed to:

store a first plurality of attribute data for a plurality of directly measured assets attached to a grid, wherein each directly measured asset of the plurality of directly measured assets is directly monitored for power performance information;

store a plurality of constraints for matching directly measured assets to other assets, wherein the other assets are attached to the grid and are not directly measured for power performance information;

receive a second plurality of attribute data for a first asset attached to the grid, wherein the first asset is not directly measured for power performance information;

compare the first plurality of attribute data to the second plurality of attribute data and the plurality of constraints associated with the first asset rather than historical time series data;

determine a directly measured asset of the plurality of directly measured assets to assign to the first asset based on the comparison; and determine a performance forecast for the first asset based on a power performance of the determined directly measured asset.

2. The system in accordance with claim 1, wherein the plurality of directly measured assets includes distributed energy resources including at least one of wind, photovoltaic, geothermal, biomass, or hydroelectric power generators.

3. The system in accordance with claim 2, wherein the first plurality of attribute data includes at least one of asset type, model, geolocation, power capacity, solar tilt angle, tilt azimuth, geospatial distance, child similarity threshold, windmill blade angle, or windmill height.

4. The system in accordance with claim 1, wherein the at least one processor is further programmed to assign the determined directly measured asset to the first asset when there is a match of all of the plurality of constraints for the first asset.

5. The system in accordance with claim 1, wherein the at least one processor is further programmed to:

determine a subset of directly measured assets that match all of the plurality of constraints for the first asset; and determine a distance between the first asset and each directly measured asset of the subset of measured assets; and select the directly measured asset of the subset of directly measured assets with the smallest distance to the first asset.

6. The system in accordance with claim 1, wherein the at least one processor is further programmed to:

determine that no directly measured asset of the plurality of directly measured assets matches all of the plurality of constraints for the first asset;

determine one or more violated constraints of the plurality of constraints for one or more of the plurality of directly measured assets; and select the directly measured asset based on a number of differences based on the corresponding one or more violated constraints.

7. The system in accordance with claim 6, wherein the at least one processor is further programmed to select the directly measured asset of the plurality of directly measured assets by relaxing a first constraint of the plurality of constraints.

8. The system in accordance with claim 1, wherein the at least one processor is further programmed to assign a scaling value to the power performance of the determined directly measured asset to determine the performance forecast.

9. The system in accordance with claim 1, wherein the at least one processor is further programmed to assign a hinge loss value to the power performance of the determined directly measured asset to determine the performance forecast, wherein the hinge loss value is based on one or more violations of the plurality of constraints for the determined managed asset.

10. The system in accordance with claim 9, wherein the hinge loss value is based on one or more weights associated with one or more violated constraints.

11. The system in accordance with claim 8, wherein the scaling value is based on a machine learning (ML) analysis of the plurality of directly measured assets, the first plurality of attribute data, and power performance of the plurality of directly measured assets.

12. The system in accordance with claim 1, wherein the plurality of directly measured assets are power generating assets.

13. The system in accordance with claim 1, wherein the plurality of directly measured assets are power loads.

14. A computer-implemented method for predicting performance of electric power generation and delivery systems, the method implemented by a computing device including at least one processor in communication with at least one memory device, wherein the method includes:

storing, in the at least one memory device, a first plurality of attribute data for a plurality of directly measured assets attached to a grid, wherein each directly measured asset of the plurality of directly measured assets is monitored for power performance information;

storing, in the at least one memory device, a plurality of constraints for matching directly measured assets to other assets, wherein the other assets are attached to the grid and are not directly measured for power performance information;

receiving, by the at least one processor, a second plurality of attribute data for a first asset attached to the grid, wherein the first asset is not directly measured for power performance information;

comparing, by the at least one processor, the first plurality of attribute data to the second plurality of attribute data and the plurality of constraints associated with the first asset rather than historical time series data;

determining, by the at least one processor, a directly measured asset of the plurality of directly measured assets to assign to the first asset based on the comparison; and determining, by the at least one processor, a performance forecast for the first asset based on a power performance of the determined directly measured asset.

15. The method in accordance with claim 14 further comprising assign the determined directly measured asset to the first asset when there is a match of all of the plurality of constraints for the first asset.

16. The method in accordance with claim 14 further comprising:

determining a subset of directly measured assets that match all of the plurality of constraints for the first asset; and determining a distance between the first asset and each directly measured asset of the subset of directly measured assets; and selecting the directly measured asset of the subset of directly measured assets with the smallest distance to the first asset.

17. The method in accordance with claim 14 further comprising:

determining that no directly measured asset of the plurality of directly measured assets matches all of the plurality of constraints for the first asset;

determining one or more violated constraints of the plurality of constraints for one or more of the plurality of directly measured assets; and selecting the directly measured asset based on a number of differences based on the corresponding one or more violated constraints.

18. The method in accordance with claim 17 further comprising selecting the directly measured asset of the plurality of directly measured assets by relaxing a first constraint of the plurality of constraints.

19. The method in accordance with claim 14 further comprising:

assign a hinge loss value to the power performance of the determined directly measured asset to determine the performance forecast, wherein the hinge loss value is based on one or more violations of the plurality of constraints for the determined managed asset.

20. A system for predicting performance of electric power generation and delivery systems comprising a computing device including at least one processor in communication with at least one memory device, wherein the at least one processor is programmed to:

store a first plurality of attribute data for a plurality of directly measured assets attached to a grid, wherein each directly measured asset of the plurality of directly measured assets is monitored for power performance information;

store a plurality of constraints for matching directly measured assets to other assets, wherein the other assets are attached to the grid and are not directly measured for power performance information;

receive a second plurality of attribute data for a plurality of first assets attached to the grid, wherein the plurality of first assets are not directly measured for power performance information;

compare the first plurality of attribute data to the second plurality of attribute data and a plurality of constraints associated with the plurality of first assets rather than historical time series data;

determine a first plurality of directly measured assets of the plurality of directly measured assets to assign to a second plurality of first assets of the plurality of first assets based on the comparison; and determine a plurality of performance forecasts for the second plurality of first assets based on a power performance of the first plurality of directly measured assets.

* * * * *